Figure 1:
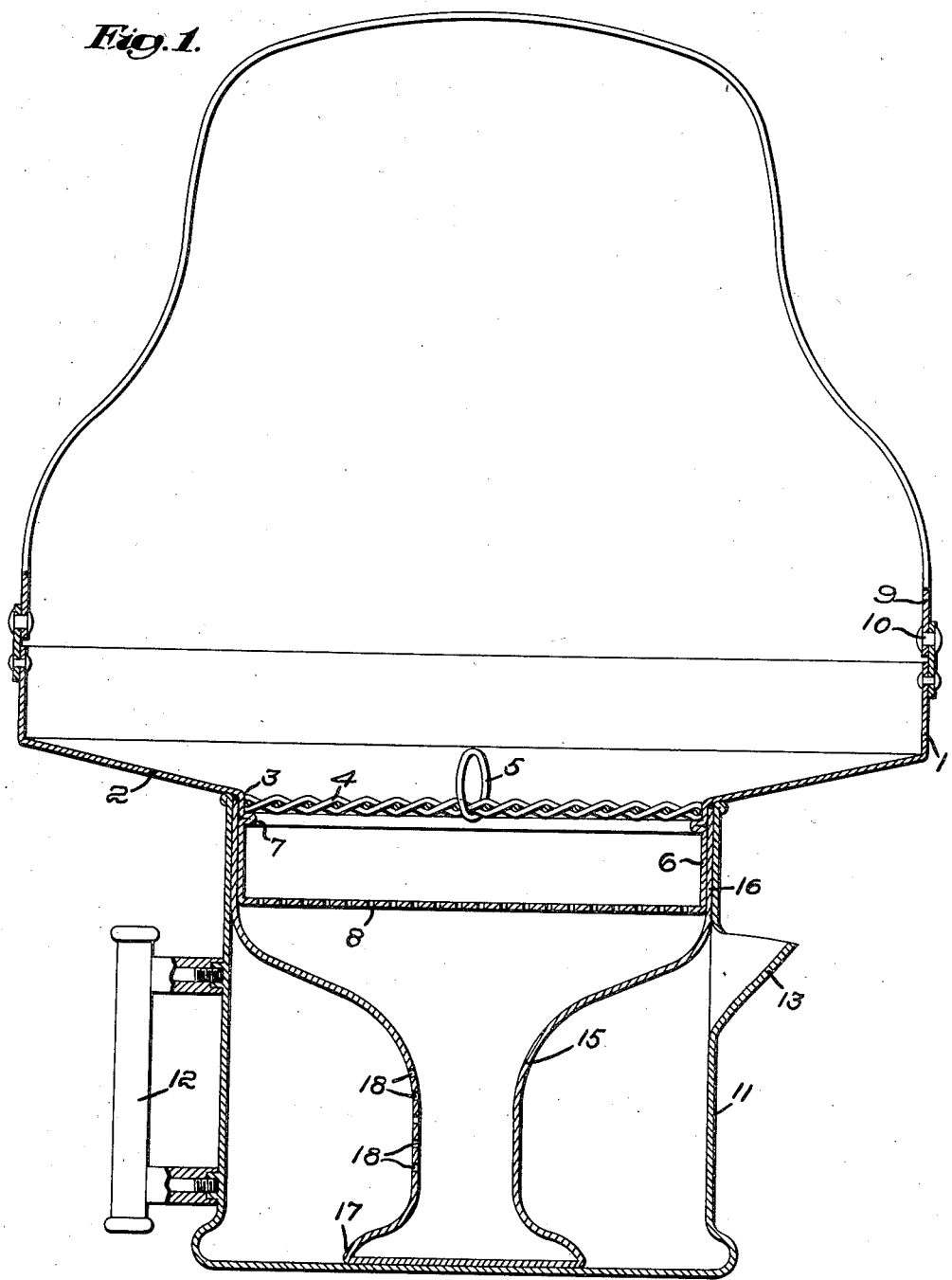

Feb. 9, 1937.   G. TOMEI   2,070,519
COOKING UTENSIL
Filed March 4, 1936   2 Sheets-Sheet 1

Inventor:
Gino Tomei,
Attys

Feb. 9, 1937.    G. TOMEI    2,070,519
COOKING UTENSIL
Filed March 4, 1936    2 Sheets-Sheet 2

UNITED STATES PATENT OFFICE 2,070,519

COOKING UTENSIL

Gino Tomei, Boston, Mass., assignor of one-third to Giuseppe Del Checcolo, and one-third to Alfredo P. Marchi, both of Somerville, Mass.

Application March 4, 1936, Serial No. 67,085

1 Claim. (Cl. 210—155)

This invention relates to cooking utensils, and more specifically to such as are used for frying, especially in connection with the use of olive or other oil, in cooking, and its object is to provide a novel and improved container and oil drainer for food and oil so used.

In the drawings of one embodiment of my invention shown and described herein:—

Figure 2:
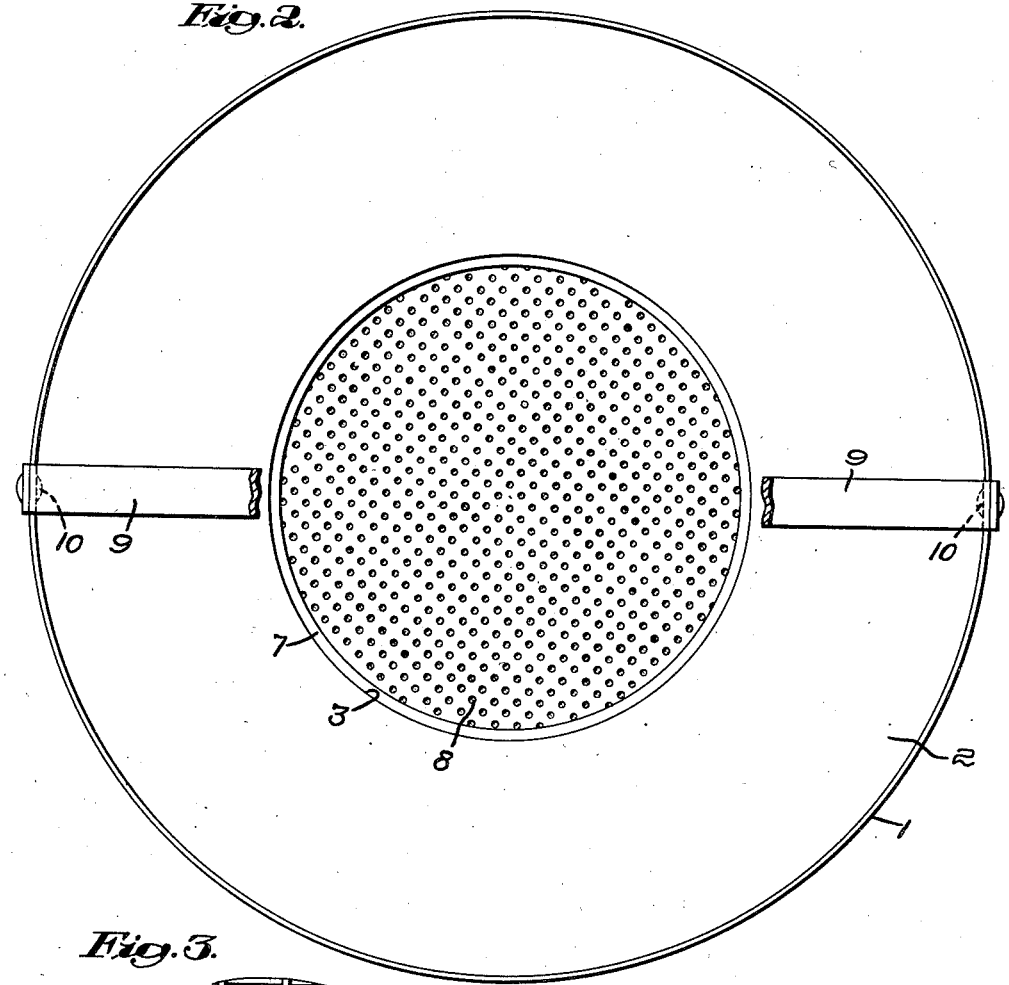

Fig. 1 is a side elevation, partly in section;

Fig. 2, a plan, certain parts being broken away for convenience; and

Figure 3:
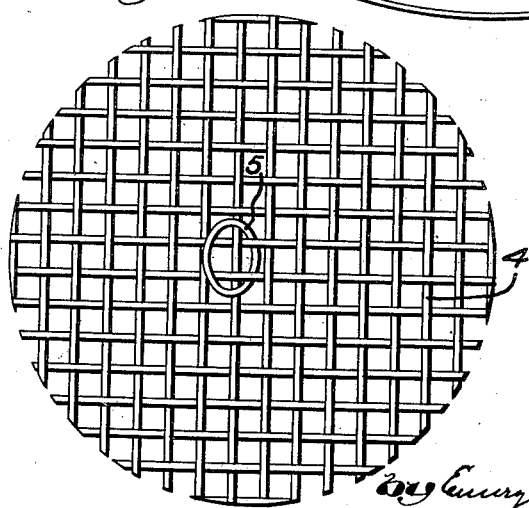

Fig. 3, a plan of the removable drainer.

Many articles of food, such as croquettes, artichokes, scallops and the like, certain kinds and cuts of meats, as chicken, and fish, are best cooked in deep fryers, so-called, and olive and other kinds of oil and fats are much used for that purpose.

When the food articles have been cooked, it is desirable that they be placed in a suitable container, and the oil or fat allowed to drain therefrom, that the food may appear more appetizing and the oil be saved.

To that end, my invention comprises a novel and convenient, portable device, as a food-receiving tray 1, of suitable size and configuration, as round or oblong, preferably shallow and capacious, with a sloping bottom 2, having a central outlet 3 therein, which may be conveniently fitted with a suitable strainer 4, with a handle, as a ring 5, for convenient removal of the strainer when desired.

The tray 1 has a substantially cup-shaped section or well 6 beneath and encircling the outlet 3, with a bead-like or other suitable element 7 on its inner wall to support the strainer 4. The cup shaped section also has on its bottom edge a second and preferably finer strainer 8, herein made integral with the cup section, but that, of course, is optional.

The cooked food is withdrawn from the frying vessel, and placed in the tray, to allow the fat to drain therefrom.

The first strainer 4 is adapted to catch the larger particles of food which may become detached from the article cooked, including bread crumbs, butter, etc., while the second strainer 8 separates from the oil or other fat the smaller food particles, and flour, egg or other similar material used in cooking, that may be partly dissolved in and carried by the oil, when it drains from the food.

For handling the tray, it is provided with a suitable bail 9, hinged to the upturned edge of the basket, as at 10, and, as a support for the tray when the oil is to be drained therefrom, I provide an oil container 11, Fig. 1, of any convenient shape, herein cylindrical, with a handle 12, and nose of spout 13, for convenient pouring of oil therefrom when desired.

The top of the member 11 is made of a size to receive the member 6 on the basket, and provide a secure support therefor, and it acts as a permanent receptacle for the oil after it has been strained of its foreign matter, and as stated, has a handle and spout for conveniently using or handling the container. The portion 6 is made relatively large, so that it may be used as a base for the tray, if it is desired to temporarily remove it from the container 11, and set it on a table.

Within the container 11 is an oil settling member 15, of convenient outline, as with a flaring top 16, to fit snugly to the inner wall of the container, and about the member 6, if desired, as herein, and with a flaring base 17 to lock the member 15 in position between the well 6 and container 11, and give the member 15 stability, when it is desired to pour oil from the spout 13, even though the tray 1 is not assembled with the other two members. This settling member is provided on its side opposite the nose of the container with ports 18. When the oil drips from the strainer 8, it passes into the receptacle 15, where any sediment still remaining settles to the bottom.

When one wishes to pour out oil to be used again, he tips up the container as a pitcher, and the oil will flow out of the ports 18, and to the nose of the container, the sediment remaining in the member 15.

If used oil is strained into the member 15 faster than it is reused, the oil, free of all impurities, will rise in the settling member and flow out of the ports 18 into the container. The member 15 can be removed from the container 11, when desired, for cleaning.

At the present time, it is customary, on removing such cooked food articles from the fryer, to place them upon pieces of paper, paper napkins or similar articles, to drain, and to permit the oil or fat to be absorbed thereby. This is an expensive custom, as much good oil is lost which might properly be used again after it has been strained. Furthermore, it is not a neat manner of removing the oil from the food, nor does it satisfactorily remove the loose food particles from the cooked food.

Furthermore, the oily pieces of paper do not look neat and inviting, and they are dangerous things to have near the fire.

After the food articles have been drained of the oil, they easily can be transferred from the tray to a platter or plate, by simply tipping the basket sidewise, if desired.

Obviously, a cover can be provided for the container, if its contents are to remain therein for any substantial length of time.

Many minor changes may be made in my food container as described, all within the scope of my invention and the appended claim.

I claim:

The combination of a pitcher-like oil container having a handle and a spout; an oil settling member within the container and with an expanded top registering with the container top and having a slender stem supported by an expanded base, the latter forming a sediment chamber to catch and hold sediment from the oil and to engage the container base, the stem having oil ports well above the sediment chamber proper for discharging oil into the container member free of sediment; and a basket-like meat supporting tray overhanging the container edge with a central draining well, and a strainer thereover registering with the settling member opening, the draining well locking the settling member in position in the container; whereby the clear oil may be poured from the settling member and container together, or from the latter alone.

GINO TOMEI.